F. C. GILLMAN.
GAS CUT-OFF.
APPLICATION FILED SEPT. 11, 1911.
1,045,693.
Patented Nov. 26, 1912.
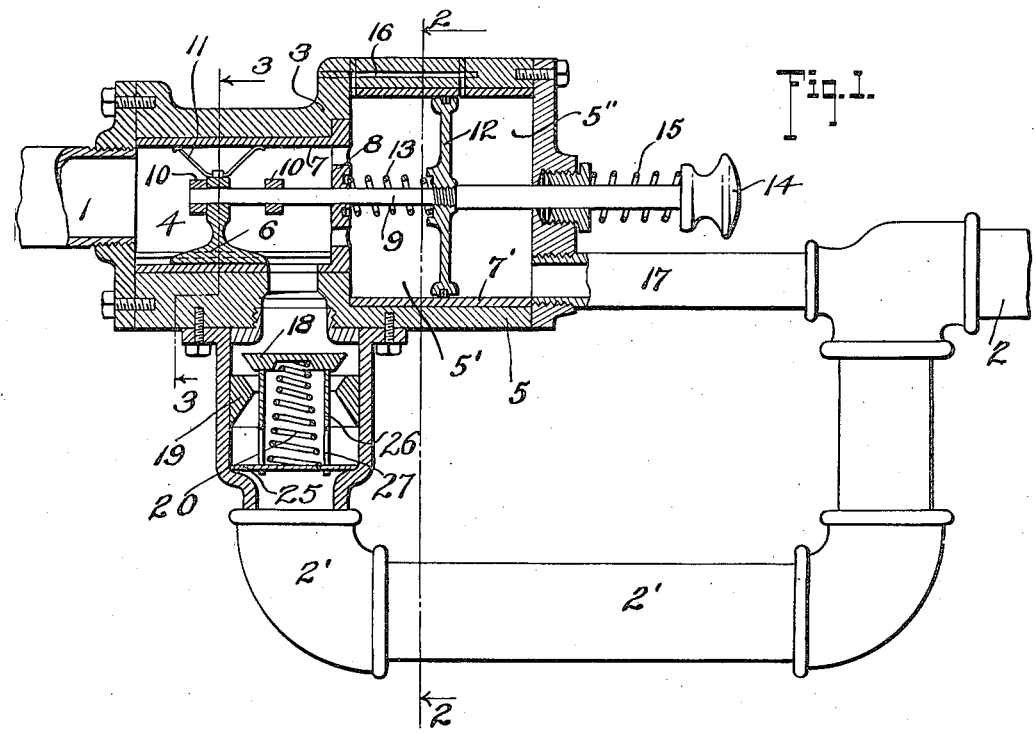
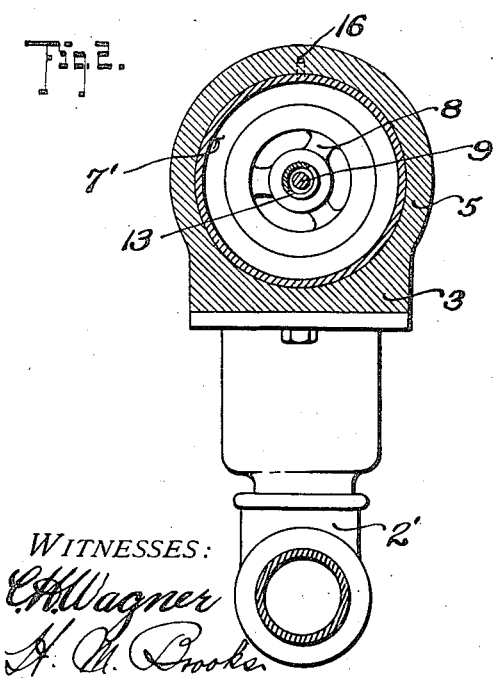
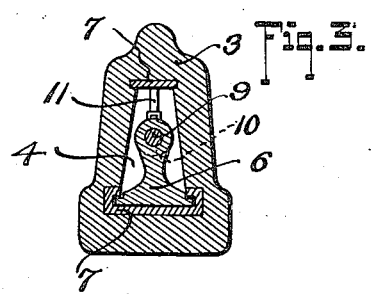
WITNESSES:
INVENTOR
F. C. Gillman
BY
Attorneys

UNITED STATES PATENT OFFICE.

FREDERICK C. GILLMAN, OF CHEHALIS, WASHINGTON.

GAS CUT-OFF.

1,045,693. Specification of Letters Patent. Patented Nov. 26, 1912.

Application filed September 11, 1911. Serial No. 648,651.

*To all whom it may concern:*

Be it known that I, FREDERICK C. GILLMAN, a citizen of the United States, residing at Chehalis, in the county of Lewis and State of Washington, have invented certain new and useful Improvements in Gas Cut-Offs, of which the following is a specification.

The present invention relates to automatic safety valves or cut-offs which may be secured to a fluid conducting pipe for automatically stopping the flow of the fluid when a leakage or other accident occurs beyond the point where this device is applied.

The invention primarily relates to that type of gas operated valves in which the pressure of the fluid cuts off the flow.

The novel feature of the present invention resides in the construction of the valve so that the latter is moved into an operative position by admitting the fluid above and below the same for equalizing the pressure on each side.

For a full understanding of the present invention, reference is to be had to the following description and to the accompanying drawings, in which—

Figure 1 is a front elevation of the present invention applied to a fluid conducting pipe, the valve construction being illustrated in section. Fig. 2 is a sectional view taken on the line 2—2 of Fig. 1. Fig. 3 is a sectional view taken on the line 3—3 of Fig. 1.

Throughout the following detail description and on the several figures of the drawings, similar parts are referred to by like reference characters.

A fluid enters through the pipe 1 and passes out through the pipe 2 after having passed through the several parts of the valve construction. The safety valve comprises a casing or body 3 which may be cast in a single piece or may be composed of several parts, as desired. The body is provided with a valve portion or chamber 4 and a piston chamber or cylinder 5 having free communication with the valve chamber 4. The valve chamber is provided with inlet and outlet openings and has slidably mounted therein a valve 6 adapted to close the outlet port. The valve chamber is lined with any desirable material 7 and is formed at its bottom portion in the shape of a channel, as clearly disclosed in Fig. 3, whereby the valve is held close down over the opening and prevented from any upward movement whatever. A web or spider 8 is interposed between the valve chamber and the piston chamber and is provided with a central bore through which is slidably mounted a piston rod 9. The terminal of the rod 9 in the valve chamber is provided with a pair of spaced lugs or rigidly secured rings 10 and has slidably mounted thereon intermediate the rings or stops 10, the valve 6. A spring 11 is secured to the top of the valve 6 and bears on the lining 7 aiding in forming a tight joint over the outlet port and also taking up any wear which may occur during operation.

In the cylinder 5, which is also lined with any suitable material 7', is a piston 12 rigidly secured on the valve or piston rod 9, said piston being retained in spaced relation with the spider 8 by a coiled spring 13 interposed therebetween. The rod 9 is extended beyond the piston 12 and protrudes through an opening formed in the casing and carries a head or knob 14 which is yieldably retained in spaced relation with the casing by a coiled spring 15, as clearly shown in Fig. 1.

A fluid conducting port or duct 16 is provided in the wall of the cylinder 5 which, when the piston is in its normal position, permits the fluid to flow into the remote portion of said cylinder.

A passage-way or pipe 17 connects the remote portion of the cylinder 5 with the outlet pipe 2. Interposed between the connection of the pipe 17 with the pipe 2 and the outlet port of the valve chamber, is a valve 18 resiliently mounted on spring 20 in the pipe 2' which latter communicates with the outlet pipe 2. The valve seat 19 is provided for the valve 18 so that when the pressure above the valve is greater than that under the valve, said valve will be caused to rest on the seat 19 to form a tight joint.

The spring 20 is connected to and supported by a spider 25, and the valve 18 is connected with a guide frame 26 having two oppositely disposed slots 27 which receive the spider 25 and permit the downward movement of said guide frame.

In Fig. 1 is disclosed the normal position of the several parts when the valve construction is in an inoperative position and the gas or fluid freely flowing therethrough. Should any leak, break, or other accident occur to the pipe 2 whereby the flow of the fluid is increased beyond the ordinary, as when the gas is used for illuminating purposes, or the like, such increase of flow will cause the valve 18 to close and thereby throw the pressure against the piston 12 which will, against the tension of the spring 13, move and draw the valve 6 over the outlet port and thereby doubly shut off the flow of the fluid. When it is desired to start the flow of the fluid, the knob 14 is depressed manually or otherwise to uncover the outlet port and also permit the flow of fluid from the portion 5' of the cylinder through the port or duct 16 to the remote portion 5'' of the cylinder and thence through the pipe 17 back through the pipe 2' and under the valve 18, thereby equalizing the pressure of the gas or fluid above and below said valve 18. Since the pressure is equalized, it will be obvious that the spring 20 will cause the unseating of the valve 18 thereby permitting the flow of the fluid in its normal course, namely, through the pipes 2' and 2.

Having thus described the invention, what is claimed as new is:

1. An automatic safety valve comprising a hollow body having inlet and outlet openings, a piston slidable within said hollow body, a valve movable with said piston adapted to close said outlet opening, a passageway connected with said outlet opening, a second valve arranged within said passageway, and a connection between said passageway and said body whereby gas is permitted to flow in a reverse direction through said passageway so as to act on said second valve.

2. An automatic safety valve comprising a hollow body having inlet and outlet openings, a piston slidable within said hollow body, a piston rod on which said piston is mounted and extending through said hollow body and passing without the same, a valve arranged on said piston rod and movable therewith, said valve being adapted to close said outlet opening, a passageway connected with said outlet opening, a second valve arranged in said passage way, means affording communication between the spaces on each side of said piston when in its normal position, and a connection between said passageway and the space opposite the non-pressure face of said piston.

3. An automatic safety valve comprising a body having a valve portion and a piston chamber, said valve portion being provided with inlet and outlet openings, a valve mounted in said valve portion for closing said outlet opening, a piston mounted in said piston chamber and connected to said valve for operating the latter, a passageway affording communication from one side to the other side of said piston when in its normal position, a second passage-way connected with said outlet opening, a second valve arranged in said second passageway, and a connection between said passageway and the space opposite the non-pressure face of said piston whereby gas may be admitted to said second passageway to act reversely on said second valve.

4. An automatic safety valve comprising a body having a valve portion and a piston chamber, said valve portion being provided with inlet and outlet openings, a valve mounted in said valve portion for closing one of the openings in said body, a piston mounted in said piston chamber and connected to said valve for operating the latter, means for permitting the flow of a fluid from one side to the other side of the piston when in its normal position, a second valve mounted in the outlet opening in said body, and a passage from said piston chamber to admit the fluid therefrom underneath said second valve.

5. An automatic safety valve comprising a body having a valve portion and a piston chamber, said valve portion being provided with an inlet opening and an outlet opening, a piston slidably mounted in said piston chamber, a valve arranged within said valve portion movable with said piston and adapted to close said outlet opening, means in said valve portion for guiding the movement of said valve, a passageway affording communication from one side to the other side of said piston when in its normal position, a second passageway connected with said outlet opening, a second valve arranged in said second passageway and a valve seat therefor, means for maintaining said second valve normally unseated, and a connection between said second passageway and said piston chamber whereby communication may be established between the portion of said chamber opposite the non-pressure face of the piston and said second valve, whereby gas may be permitted to flow in a reverse direction through said second passageway to unseat said second valve.

6. An automatic safety valve comprising a body having a valve portion and a piston chamber, said valve portion being provided with an inlet opening and an outlet opening, a piston slidably mounted within said piston chamber, a piston rod on which said piston is mounted extending through said valve portion and said piston chamber, and extending without the latter, a spider arranged between said piston chamber and said valve portion and affording communication therebetween, a spring interposed between said spider and said piston, a valve connected with said piston rod and slidable within said valve portion to open and close said outlet opening, means for permitting the flow of fluid from one side to the other side of said piston when in its normal position, a passageway connected with said outlet opening, a second valve arranged within said passageway, said valve normally permitting the passage of fluid from said outlet opening through said passageway, and a connection between said passageway and said piston chamber whereby gas may be permitted to flow through said passageway in a reverse direction to act on said second valve, said piston and first named valve being adapted to be restored to their normal positions by pressure on said piston rod from without.

In testimony whereof I affix my signature in presence of two witnesses.

FREDERICK C. GILLMAN.

Witnesses:
A. A. HULL,
J. C. COOK.